United States Patent
Ohno et al.

(10) Patent No.: US 6,703,645 B2
(45) Date of Patent: Mar. 9, 2004

(54) SPIN FILTER

(75) Inventors: Hideo Ohno, Sendai (JP); Keita Ohtani, Sendai (JP)

(73) Assignee: Tohoku University, Sendai (JP)

( * ) Notice: Subject to any disclaimer, the term of this patent is extended or adjusted under 35 U.S.C. 154(b) by 0 days.

(21) Appl. No.: 10/291,687

(22) Filed: Nov. 12, 2002

(65) Prior Publication Data

US 2003/0122148 A1 Jul. 3, 2003

(30) Foreign Application Priority Data

Nov. 13, 2001 (JP) .................................... 2001-346909

(51) Int. Cl.⁷ .............................................. H01L 33/00
(52) U.S. Cl. .......................... 257/103; 257/14; 257/15; 257/22; 257/23
(58) Field of Search ...................... 257/14, 103, 15, 257/22, 23

(56) References Cited

U.S. PATENT DOCUMENTS

| | | | |
|---|---|---|---|
| 6,218,718 B1 * | 4/2001 | Gregg et al. | 257/421 |
| 6,355,953 B1 * | 3/2002 | Kirczenow | 257/295 |
| 6,545,329 B1 * | 4/2003 | Lannon, Jr. et al. | 257/414 |
| 2002/0064004 A1 * | 5/2002 | Worledge | 360/324.2 |
| 2002/0126426 A1 * | 9/2002 | Gill | 360/324.12 |
| 2003/0059588 A1 * | 3/2003 | Hannah et al. | 428/200 |
| 2003/0075767 A1 * | 4/2003 | Lannon, Jr. et al. | 257/414 |
| 2003/0075772 A1 * | 4/2003 | Efros et al. | 257/500 |

FOREIGN PATENT DOCUMENTS

JP  2002343958 A * 11/2002 ............ H01L/29/66

* cited by examiner

Primary Examiner—Amir Zarabian
Assistant Examiner—Ida M. Soward
(74) Attorney, Agent, or Firm—Oliff & Berridge, PLC

(57) ABSTRACT

A spin filter is composed of a first magnetic semiconductor multi-quantum well structure, a second magnetic semiconductor multi-quantum well structure and a non-magnetic semiconductor quantum well structure which is located between the first magnetic semiconductor multi-quantum well structure and the second magnetic semiconductor multi-quantum well structure. The first magnetic semiconductor multi-quantum well structure and the second magnetic semiconductor multi-quantum well structure are split in spin state. Carriers in down-spin state are penetrated through the first magnetic semiconductor multi-quantum well structure and carriers in up-spin state are penetrated through the second magnetic semiconductor multi-quantum well structure.

17 Claims, 3 Drawing Sheets

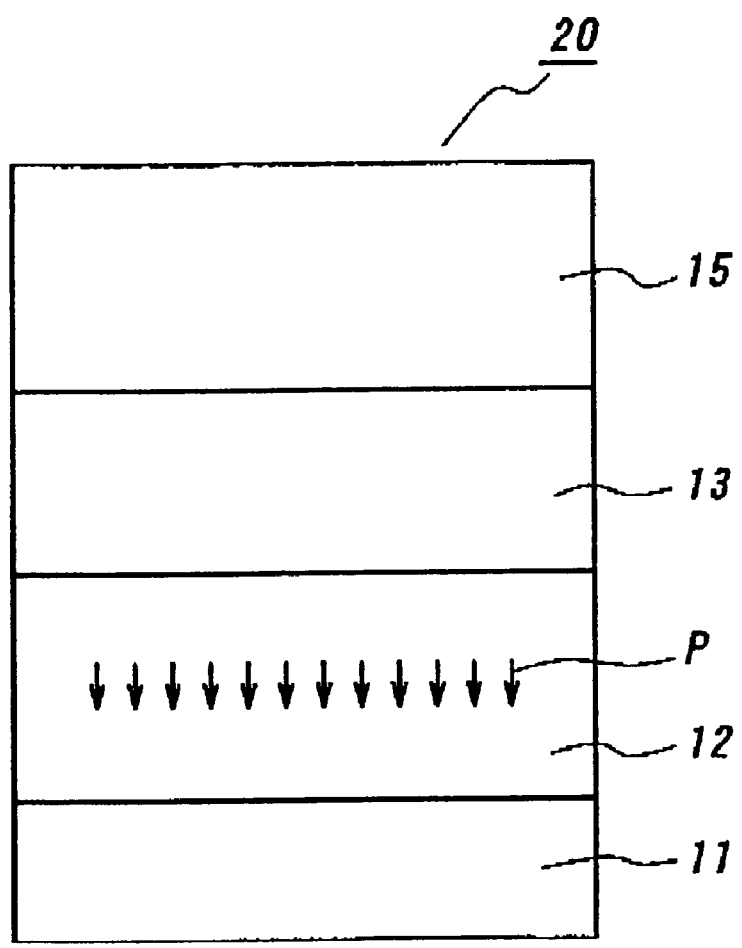

SPIN FILTER

BACKGROUND OF THE INVENTION

1. Field of the Invention

This invention relates to a spin filter preferably usable for quantum communication and quantum information processing.

2. Description of the Prior Art

Recently, much attention is paid to such research and development for quantum communication and quantum operation utilizing electron spin. In such a quantum technique, it is required to measure the spin directions of carriers to be utilized by means of unitary conversion when information is read. In order to measure the spin direction of carriers high sensitively, Time-Resolved Faraday Rotation Method has been developed and currently practically employed, but the operationality of the Faraday Rotation method is complicated because it requires a large-scale laser apparatus.

SUMMERY OF THE INVENTION

It is an object of the present invention to provide an element capable of easily measuring the spin directions of carriers to be utilized in such a technique as quantum communication and quantum operation.

In order to achieve the above object, this invention relates to a spin filter including a first magnetic semiconductor multi-quantum well structure, a second magnetic semiconductor multi-quantum well structure and a non-magnetic semiconductor quantum well structure which is located between the first magnetic semiconductor multi-quantum well structure and the second magnetic semiconductor multi-quantum well structure, the first magnetic semiconductor multi-quantum well structure and the second magnetic semiconductor multi-quantum well structure being split in spin state, whereby carriers in down-spin state are penetrated through the first magnetic semiconductor multi-quantum well structure and carriers in up-spin state are penetrated through the second magnetic semiconductor multi-quantum well structure.

This invention also relates to a spin filter comprising a magnetic semiconductor multi-quantum well structure and a non-magnetic semiconductor quantum well structure which is located adjacent to the magnetic semiconductor multi-quantum well structure, the magnetic semiconductor multi-quantum well structure being split in spin state, whereby carriers either in down-spin state or in up-spin state are penetrated through the magnetic semiconductor multi-quantum well structure.

The inventors have developed a spin filter composed of a magnetic semiconductor multi-quantum well structure and a non-magnetic semiconductor multi-quantum well structure as mentioned above in order to measure the spin directions of carriers.

For example, the magnetic semiconductor multi-quantum well structure can be made of II-V semiconductor compound, particularly as a multilayered structure composed of ZnSe layers and ZnMnSe layers which are stacked alternately. When the thicknesses of the ZnSe layer and the ZnMnSe layer are controlled appropriately, only carriers in down-spin state or up-spin state within a given energy range can be penetrated through the magnetic semiconductor multi-quantum well structure.

FIG. 1 is graphs showing the permeability of carriers in simulation when the thicknesses of the ZnSe layer and the ZnMnSe layer constituting the magnetic semiconductor multi-quantum well structure are varied. The simulation was performed under the condition that the ambient temperature was set to 4K and the strength of the magnetic field to be applied was set to 5T and the stacking periodic number was set to 10.

As is apparent from FIG. 1(a), when both of the thicknesses of the ZnSe layer and the ZnMSe layer were set to 5 nm, only the carriers in up-spin state within an energy range of about 20–30 meV can be penetrated and only the carriers in down-spin state within an energy range of about 30–40 meV can be penetrated.

Then, as is apparent from FIG. 1(b), when both of the thicknesses of the ZnSe layer and the ZnMnSe layer were set to 7.5 nm, only the carriers in up-spin state within an energy range in the vicinity of about 10 meV can be penetrated and only the carriers in down-spin state within an energy range of about 10–20 meV can be penetrated. In addition, as is apparent from FIG. 1(c), when both of the thicknesses of the ZnSe layer and the ZnMnSe layer were set to 10 nm, only the carriers in down-spin state within an energy range in the vicinity of about 10 meV can be penetrated.

Therefore, in the first spin filter according to the present invention, if ZnSe layers and ZnMnSe layers each having a slightly smaller thickness than 7.5 nm are stacked alternately to form the first magnetic semiconductor multi-quantum well structure, and ZnSe layers and ZnMnSe layers each having a thickness of 5 nm are stacked alternately to form the second magnetic semi-conductor multi-quantum well structure, as is apparent from FIGS. 1(a) and 1(b), the carriers in down-spin state within an energy range of about 20–30 meV can be penetrated through the first magnetic semiconductor multi-quantum well structure and the carriers in up-spin state within the same energy range can be penetrated through the second magnetic semiconductor multi-quantum well structure.

As a result, according to the first spin filter of the present invention, the carriers in down-spin state and up-spin state within the same energy range can be filtered simultaneously.

Moreover, if the first magnetic semiconductor multi-quantum well structure and the second magnetic semiconductor multi-quantum well structure are formed in similar configuration, the carriers in down-spin state and up-spin state within their respective different energy ranges can be filtered.

For example, if both of the first magnetic semiconductor multi-quantum well structure and the second magnetic semiconductor multi-quantum well structure are composed of the same multilayered structure where ZnSe layers and ZnMnSe layers each having a thickness of 5 nm are stacked alternately, as is apparent from FIG. 1(a), the carriers in up-spin state within an energy range of about 20–30 meV can be penetrated and the carriers in down-spin state within an energy range of about 30–40 meV can be penetrated.

If it is required that only the carriers either in down-spin state or up-spin state within a given energy range is penetrated, a single magnetic semiconductor multi-quantum well structure is provided, as a substitute for the first and the second magnetic semiconductor multi-quantum well structure.

For example, if a single magnetic semiconductor multi-quantum well structure where ZnSe layers and ZnMnSe layer each having a thickness of 5 nm are stacked alternately is provided, as is apparent from FIG. 1(a), only the carriers in up-spin state within an energy range of about 20–30 meV can be penetrated and only the carriers in down-spin state within an energy range of about 30–40 meV can be penetrated. The second spin filter of the present invention is conceived on the above-mentioned viewpoint.

As mentioned above, according to the first and the second spin filters of the present invention, Carriers can be selectively penetrated and thus, filtered. Therefore, the spin filters can be employed as a next-generation element usable for quantum communication and quantum operation.

In the present invention, the term "carrier" means an electron or a hole in solid substance such as the magnetic semiconductor multi-quantum well structure, and generated by the irradiation of light or the application of electric field.

BRIEF DESCRIPTION OF THE DRAWINGS

For better understanding of the present invention, reference is made to the attached drawings, wherein FIG. 3 is a structural view showing an embodiment of the second spin filter of the present invention.

DESCRIPTION OF THE PREFERRED EMBODIMENTS

Figure 1A:
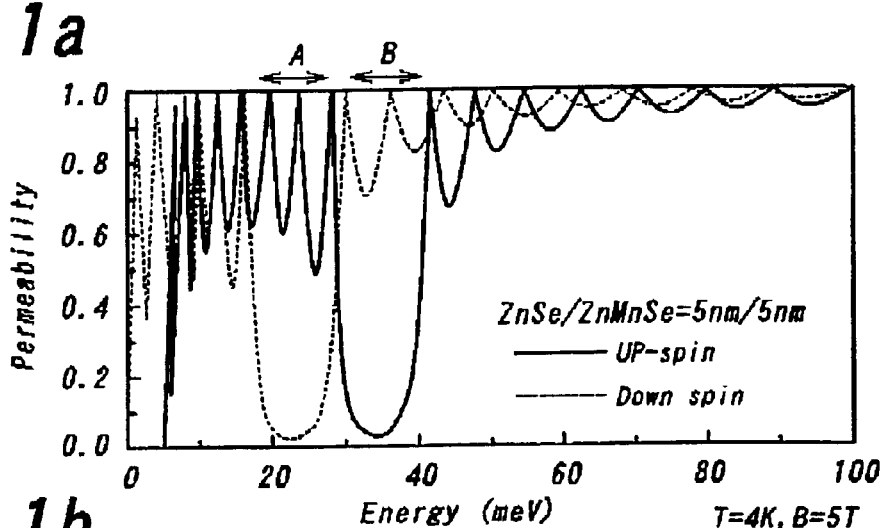
FIGS. 1a–1c are graphs showing the permeability of carriers in simulation of the spin filter of the present invention.
Figure 1B:
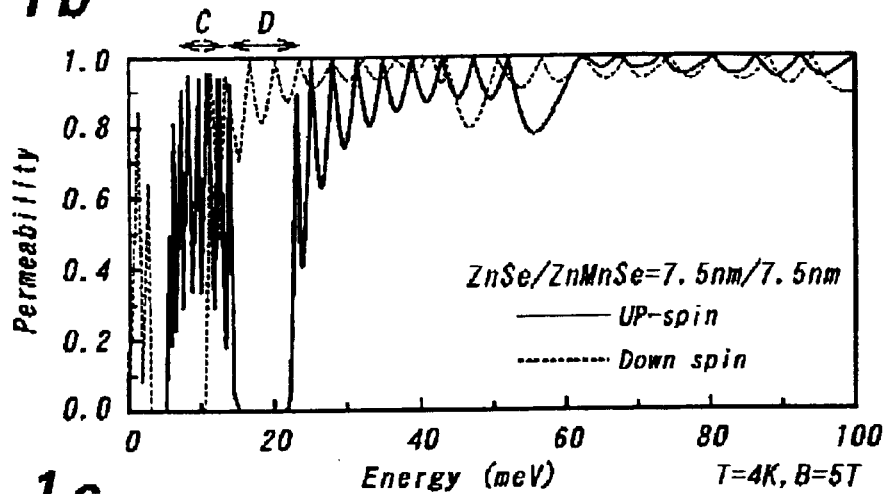
Figure 1C:
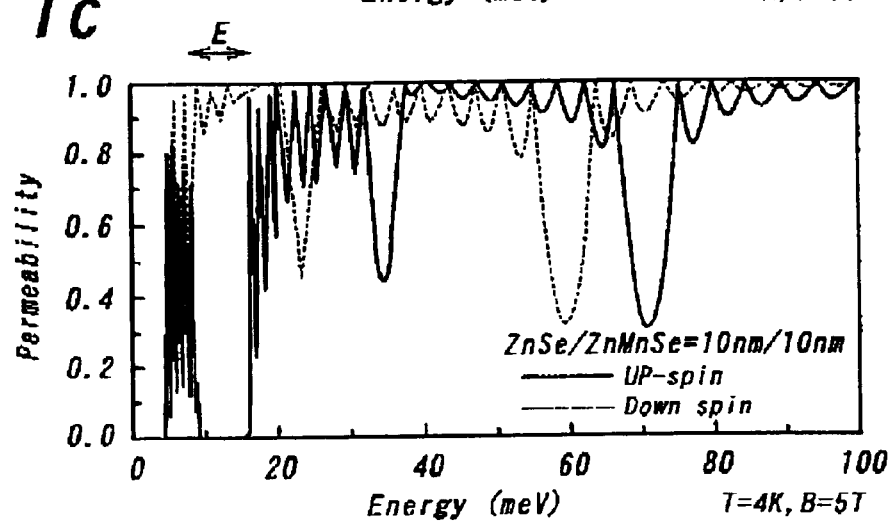
Figure 2:
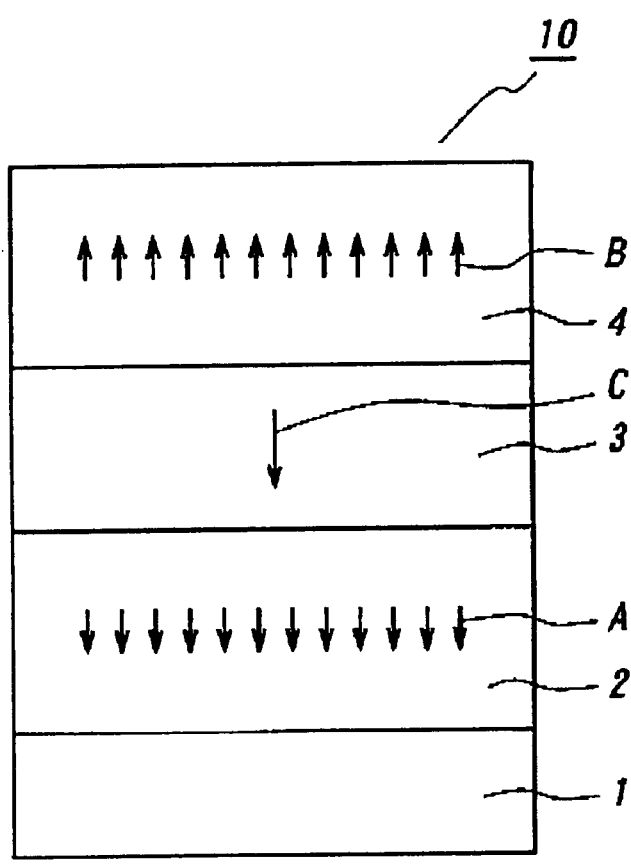
FIG. 2 is a structural view showing an embodiment of the first spin filter of the present invention.

This invention will be described in detail with reference to the accompanying drawings. FIG. 2 is a structural view showing an embodiment of the first spin filter of the present invention. The spin filter 10 illustrated in FIG. 2 includes the semiconductor substrate 1 made of e.g., GaAs, the first magnetic semiconductor multi-quantum well structure 2, the non-magnetic semiconductor quantum well structure 3 and the second magnetic semiconductor multi-quantum well structure 4 which are stacked on the substrate 1 in turn.

Suppose that the first and the second magnetic semiconductor multi-quantum well structures 2 and 4 are split in spin state, and thus, the carriers in down-spin state are penetrated through the first magnetic semiconductor multi-quantum well structure 2 and the carriers in up-spin state are penetrated through the second magnetic semiconductor multi-quantum well structure 4. In this case, electric charges are generated and thus, they move in the direction along the arrow "A" in the first magnetic semiconductor multi-quantum well structure 2 commensurate with the spin direction of the penetrated carriers in down-spin state. On the other hand, electric charges are also generated a thus, they move in the direction along the arrow "B" opposite to the direction along the arrow "A" in the second magnetic semiconductor multi-quantum well structure 4 commensurate with the spin direction of the penetrated carriers in up-spin state.

Therefore, when the amounts of electric charges in the first and the second magnetic semiconductor multi-quantum well structure are measured, the amounts of the carriers in down-spin state and up-spin state can be measured.

The spin filter 10 functions as an individual element. In addition, the spin state of carriers to be generated is changed depending on an external excitation. Therefore, the response of the spin filter 10 for the external excitation becomes important.

In this point of view, normally, the response of the spin filter 10 is measured from the combined amount of electric charges in the first and the second magnetic semiconductor multi-quantum well structure. That is, the total response of the spin filter 10 itself for all of the carriers excited within a given energy range to be filtered becomes important, and thus, the response of the spin filter 10 for the carriers in down-spin state or up-spin state excited within the same energy level does not practically becomes important.

In this case, the non-magnetic semiconductor quantum well structure 3 is excited to a given energy level to generate carriers therein, and thus, to make the spin filter 10 in electric conduction. Therefore, if the electric charges generated through the spin filter 10 along the arrow "C" are measured, the total response of the spin filter 10 for the carriers can be measured.

Particularly, it is desired that a sub-band energy gap light is irradiated to and thus, excites the non-magnetic semiconductor quantum well structure 3 to a given sub-band energy level, and then, the thus generated electric charges are measured. Herein, the sub-band energy gap light means a light having an energy equal to the sub-band gap energy in the same energy level band or their respective different energy level bands. Since the sub-band energy gap light does not affect on the spin states of the carriers, the filtering condition can be monitored precisely from the measurement of the electric charges when the sub-band energy gap light is irradiated.

The first and the second magnetic semiconductor multi-quantum well structure 2, 4 and the non-magnetic semiconductor quantum well structure 3 may be made of II-V semiconductor compound. For example, the first and the second magnetic semiconductor multi-quantum well structure 2 and 4 may be made of multilayered structures, each composed of ZnSe layers and ZnMnSe layers which are stacked alternately. In this case, the non-magnetic semiconductor quantum well structure 3 may be made of a multilayered structure composed of a ZnCdSe layer and a ZnSe layer or composed of ZnCdSe layers and ZnSe layers which are stacked alternately.

Moreover, the first and the second magnetic semiconductor multi-quantum well structure 2 and 4 may be made of multilayered structures, each composed of ZnSe layers and ZnCdMnSe layers which are stacked alternately. In this case, the non-magnetic semiconductor quantum well structure 3 may be made of a multilayered structure composed of a ZnCdSe layer and a ZnSe layer or composed of ZnCdSe layers and ZnSe layers which are stacked alternately.

FIG. 3 is a structural view showing an embodiment of the second spin filter of the present invention. The spin filter 20 illustrated in FIG. 3 includes the semiconductor substrate 11 made of e.g., GaAs, the first magnetic semiconductor multi-quantum well structure 12, the non-magnetic semiconductor quantum well structure 13 and the semiconductor barrier layer 15 which are stacked on the substrate 11 in turn. In this case, when the magnetic semiconductor multi-quantum well structure 12 is split in spin state by applying a given magnetic field, the carriers in down-spin state or up-spin state can be penetrated and thus, filtered commensurate with the energy level thereof.

If the carriers in down-spin state is filtered, electric charges move in the magnetic semiconductor multi-quantum well structure 12 along the arrow "P" through their generation. If the carriers in up-state is filtered, electric charges move in the magnetic semiconductor multi-quantum well structure 12 along the arrow "P" through their generation. Therefore, if the electric charges originated from the electric field are measured, the amount of the carriers in down-spin state or the up-spin state which are filtered can be measured.

In measurement, the non-magnetic semiconductor quantum well structure 13 is excited to generate carriers, and the total amount of electric charges through the spin filter 20 is measured, as mentioned above. Preferably, a given light is irradiated to and excites the non-magnetic semiconductor quantum well structure 13 to a given energy level. In this case, since the light does not affect on the spin states of the carriers, the filtering condition can be monitored precisely when the thus generated electric charges are measured.

In FIG. 3, the semiconductor barrier layer 15 is prepared in order to confine the carriers effectively, and thus, the bandgap of the semiconductor barrier layer 15 is set larger than the bandgaps of the magnetic semiconductor multi-quantum well structure 12 and the non-magnetic semiconductor quantum well structure 13. However, the semiconductor barrier layer 15 is not essential, so may be omitted. Without the semiconductor barrier layer, therefore, the second spin filter can exhibit the above-mentioned function and effect. The function of the semiconductor barrier layer may be imparted to the substrate 11.

The magnetic semiconductor multi-quantum well structure 12 and the non-magnetic semiconductor quantum well structure 13 may be made of II-V semiconductor compound. For example, the magnetic semiconductor multi-quantum well structure 12 may be made of a multilayered structure composed of ZnSe layers and ZnMnSe layers which are stacked alternately. In this case, the non-magnetic semiconductor quantum well structure 13 may be made of a multilayered structure composed of a ZnCdSe layer and a ZnSe layer or composed of ZnCdSe layers and ZnSe layers which are stacked alternately.

Moreover, the magnetic semiconductor multi-quantum well structure 12 may be made of a multilayered structure composed of ZnSe layers and ZnCdMnSe layers which are stacked alternately. In this case, the non-magnetic semiconductor quantum well structure 13 may be made of a multi-layered structure composed of a ZnCdSe layer and a ZnSe layer or composed of ZnCdSe layers and ZnSe layers which are stacked alternately.

The semiconductor barrier layer 15 may be made of BeTe, ZnSSe or ZnMgSe.

Although the present invention was described in detail with reference to the above examples, this invention is not limited to the above disclosure and every kind of variation and modification may be made without departing from the scope of the present invention.

For example, in the second spin filter of the present invention, the function of the semiconductor barrier layer may be incorporated in the non-magnetic semiconductor quantum well structure. For example, the non-magnetic semiconductor quantum well structure may be made of a material to constitute the barrier layer, e.g., BeTe. In this case, the non-magnetic semiconductor quantum well structure may be made of a superlattice structure composed of e.g., ZnCdSe layers and BeTe layers which are stacked alternately.

A high frequency wave generator can be fabricated by utilizing the spin filter of the present invention For example, in the spin filter shown in FIG. 2, when the first and the second magnetic semiconductor multi-quantum well structure 2 and 4 are split in spin state by applying a magnetic field, and a circularly polarized light having an energy equal to bandgap energy of the non-magnetic semiconductor quantum well structure 3 is irradiated, processing electron spins are generated in the non-magnetic semiconductor quantum well structure 3. Then, a sub-band energy gap light is irradiated to the non-magnetic semiconductor quantum well structure 3 as mentioned above, and the electric charges in the first and the second magnetic semiconductor multi-quantum well structure 2 and 4 are measured.

Since the flow direction of electric current is changed commensurate with the spin directions of the electrons, it is changed commensurate with the frequencies of the precession movements of the electrons. On the other band, the frequencies of the precession movements are varied linearly in proportion to the strength of the magnetic field applied. Therefore, if an antenna is employed in combination with the spin filter, a high frequency wave generator of wide variable range in frequency can be provided.

In the above-mentioned embodiments, plural carriers are employed and filtered as a carrier group to measure the spin direction of the carrier group, but single carrier may be employed and filtered.

Moreover, in the above-mentioned embodiments, the first magnetic semiconductor multi-quantum well structure 2 and the like is made of II-V semiconductor compound, but may be III-V ferromagnetic semiconductor compound.

As mentioned above, according to the present invention, an spin filter which can easily measure the spin directions of carriers to be utilized in such a technique as quantum communication and quantum operation can be provided.

What is claimed is:

1. A spin filter comprising a first magnetic semiconductor multi-quantum well structure, a second magnetic semiconductor multi-quantum well structure and a non-magnetic semiconductor quantum well structure which is located between said first magnetic semiconductor multi-quantum well structure and said second magnetic semiconductor multi-quantum well structure, said first magnetic semiconductor multi-quantum well structure and said second magnetic semiconductor multi-quantum well structure being split in spin state, whereby carriers in down-spin state are penetrated through said first magnetic semiconductor multi-quantum well structure and carriers in up-spin state are penetrated through said second magnetic semiconductor multi-quantum well structure.

2. The spin filter as defined in claim 1, wherein said non-magnetic semiconductor quantum well structure is excited to a given energy level, and said carriers in down-spin state and up-spin state penetrated through said first magnetic semiconductor multi-quantum well structure and said second magnetic semiconductor multi-quantum well structure are determined in quantity by measuring electric charges through said spin filter.

3. The spin filter as defined in claim 2, wherein said non-magnetic semiconductor quantum well structure is excited by means of a sub-band energy gap light to a given sub-band energy level.

4. The spin filter as defined in claim 1, wherein at least one of said first magnetic semiconductor multi-quantum well structure and said second magnetic semiconductor multi-quantum well structure is made of a multilayered structure composed of ZnSe layers and ZnMnSe layers which are stacked alternately, and said non-magnetic semiconductor quantum well structure is made of a multilayered structure composed of a ZnCdSe layer and a ZnSe layer.

5. The spin filter as defined in claim 1, wherein at least one of said first magnetic semiconductor multi-quantum well structure and said second magnetic semiconductor multi-quantum well structure is made of a multilayered structure composed of ZnSe layers and ZnMnSe layers which are stacked alternately, and said non-magnetic semiconductor quantum well structure is made of a multilayered structure composed of ZnCdSe layers and ZnSe layers which are stacked alternately.

6. The spin filter as defined in claim 1, wherein at least one of said first magnetic semiconductor multi-quantum well structure and said second magnetic semiconductor multi-quantum well structure is made of a multilayered structure composed of ZnSe layers and ZnCdMnSe layers which are stacked alternately, and said non-magnetic semiconductor quantum well structure is made of a multilayered structure composed of a ZnCdSe layer and a ZnSe layer.

7. The spin filter as defined in claim 1, wherein at least one of said first magnetic semiconductor multi-quantum well structure and said second magnetic semiconductor multi-quantum well structure is made of a multilayered structure composed of ZnSe layers and ZnCdMnSe layers which are stacked alternately, and said non-magnetic semiconductor quantum well structure is made of a multilayered structure composed of ZnCdSe layers and ZnSe layers which are stacked alternately.

8. A spin filter comprising a magnetic semiconductor multi-quantum well structure and a non-magnetic semiconductor quantum well structure which is located adjacent to said magnetic semiconductor multi-quantum well structure, said magnetic semiconductor multi-quantum well structure being split in spin state, whereby carriers either in down-spin state or in up-spin state are penetrated through said magnetic semiconductor multi-quantum well structure.

9. The spin filter as defined in claim 8, further comprising a semiconductor barrier layer adjacent to said non-magnetic semiconductor quantum well structure in the opposite side to said magnetic semiconductor multi-quantum well structure.

10. The spin filter as defined in claim 8, wherein said non-magnetic semiconductor quantum well structure is excited to a given energy level, and said carriers either in down-spin state or up-spin state penetrated through said magnetic semiconductor multi-quantum well structure are determined in quantity by measuring electric charges through said spin filter.

11. The spin filter as defined in claim 10, wherein said non-magnetic semiconductor quantum well structure is excited by means of an external light.

12. The spin filter as defined in claim 8, said magnetic semiconductor multi-quantum well structure is made of a multilayered structure composed of ZnSe layers and ZnMnSe layers which are stacked alternately, and said non-magnetic semiconductor quantum well structure is made of a multilayered structure composed of a ZnCdSe layer and a ZnSe layer.

13. The spin filter as defined in claim 8, wherein said magnetic semiconductor multi-quantum well structure is made of a multilayered structure composed of ZnSe layers and ZnMnSe layers which are stacked alternately, and said non-magnetic semiconductor quantum well structure is made of a multilayered structure composed of ZnCdSe layers and ZnSe layers which are stacked alternately.

14. The spin filter as defined in claim 8, wherein said magnetic semiconductor multi-quantum well structure is made of a multilayered structure composed of ZnSe layers and ZnCdMnSe layers which are stacked alternately, and said non-magnetic semiconductor quantum well structure is made of a multilayered structure composed of a ZnCdSe layer and a ZnSe layer.

15. The spin filter as defined in claim 8, wherein said magnetic semiconductor multi-quantum well structure is made of a multilayered structure composed of ZnSe layers and ZnCdMnSe layers which are stacked alternately, and said non-magnetic semiconductor quantum well structure is made of a multilayered structure composed of ZnCdSe layers and ZnSe layers which are stacked alternately.

16. A high frequency wave generator comprising a spin filter as defined in claim 1.

17. A high frequency wave generator comprising a spin filter as defined in claim 8.

* * * * *